United States Patent [19]
Hofmann

[11] 3,713,191
[45] Jan. 30, 1973

[54] BELT CLASP

[76] Inventor: Ludwig Hofmann, Markgrafenstr. 10, Buhl/Baden, Germany

[22] Filed: Feb. 23, 1971

[21] Appl. No.: 118,008

[30] Foreign Application Priority Data

April 7, 1970 Germany .................... P 20 16 451.6

[52] U.S. Cl. ............................ 24/201 A, 24/265 CD
[51] Int. Cl. ........................... A44b 17/00, A44c 5/18
[58] Field of Search ...................... 24/201 A, 265 CD

[56] References Cited

UNITED STATES PATENTS

| | | | |
|---|---|---|---|
| 3,030,686 | 4/1962 | Burkhardt | 24/265 B |
| 2,984,885 | 5/1961 | Elsner | 24/201 A |
| 3,178,790 | 4/1965 | Cech | 24/265 CD |
| 3,332,123 | 7/1967 | Higuchi | 24/265 CD |
| 3,439,390 | 4/1969 | Prete | 24/265 CD |

*Primary Examiner*—Bernard A. Gelak
*Attorney*—Allison C. Collard

[57] ABSTRACT

A belt clasp for attachment to an anchor bar consisting of a plurality of flat metal pieces laterally engaging the anchor bar in an inverted position and attached to the end loop of a belt. The metal pieces are displaceable in a longitudinal direction by means of a spring, and are provided with shoulders which engage support surfaces on the anchoring bar to secure the belt therein.

2 Claims, 4 Drawing Figures

PATENTED JAN 30 1973 3,713,191
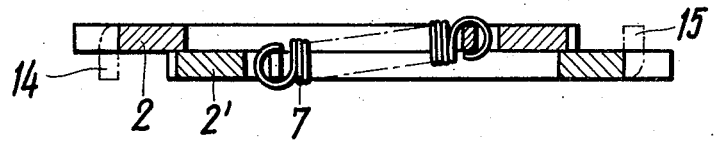
Fig. 2 (A-B)
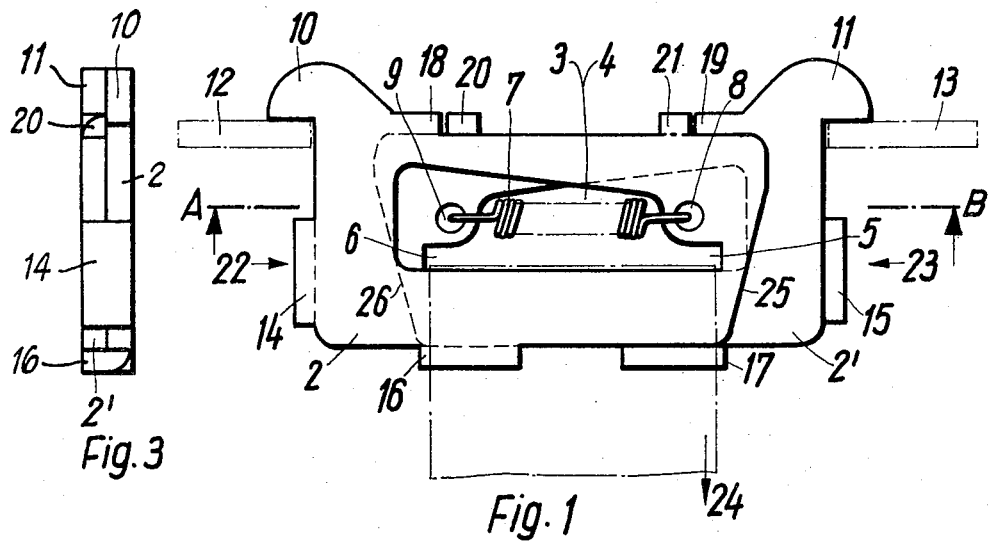
Fig. 3   Fig. 1
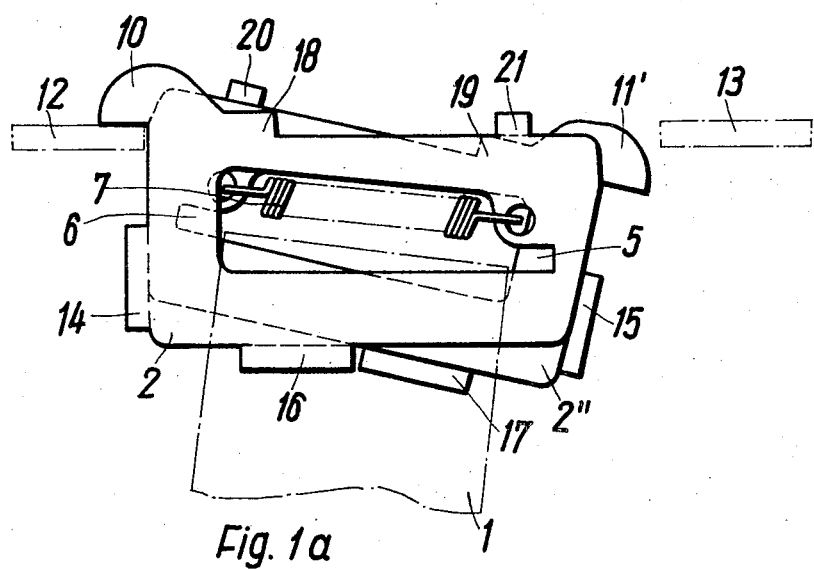
Fig. 1a
Inventor:
LUDWIG HOFMANN
By Allison C Collard
Attorney

BELT CLASP

The present invention relates to a belt with fittings mounted on the ends thereof for hanging the belt in an anchoring bar.

When loads are transported on vehicles, it is often necessary to prevent lateral sliding or displacement thereof on the vehicles so that the loads do not fall from the vehicle while it is moving. Fastening belts are presently used to secure bulk loads to transport vehicles, and anchoring faces or couplings are provided on the vehicle. These anchors typically consist of flat metal pieces, which have two support faces, into which the fastening belts are inserted.

Belt fasteners which consist of one or a plurality of loops which are mounted on the end loop of the belt are known. The fasteners are provided with two lateral protrusions which engage an anchoring bar when they are mounted thereon. These conventional loops must be mounted obliquely with respect to the anchoring bar, or they must be turned or tilted, so that the protrusions come to rest on the supporting surface of the anchoring bar. Furthermore, to prevent the loops from accidentally slipping off the anchoring bar, an additional safety device is required.

In the present invention, a belt is provided which overcomes the above mentioned disadvantages of conventional devices. The invention provides a belt clasp wherein a plurality of flat metal pieces are mounted in a laterally inverted position in an end loop of the belt. The flat metal pieces are provided with a plurality of openings having broadened recesses for receiving the belt. The metal pieces are displaceable in a longitudinal direction by a pull or tension spring which is secured at each end in apertures provided in the metal pieces. The metal pieces are biased towards each other by means of the force exerted by the spring. The metal pieces are also provided with shoulders for engaging the resting or support faces of the anchor bar.

In the present invention, the belt is mounted in the anchor by inserting one of the two metal pieces in the anchoring bar so that the shoulder thereof engages one side of the anchor, and the other metal piece is displaced between the two shoulders and then inserted into the other side of the anchor bar so that the shoulder thereof engages the other side of the anchor. The shoulders of the metal pieces are, thus, inserted alternately into the opening of the anchoring bar. When one of the metal pieces is released, both metal pieces are forced away from each other in the longitudinal direction by the force exerted by the spring. Until the two metal pieces securely engage the supporting faces of the anchor bar. In order to release the metal pieces, one of the two metal pieces is displaced longitudinally towards the other, so that the distance between the shoulders is reduced, until one of the shoulders can be tilted out of the opening between the two supporting surfaces of the anchor bar.

In order to limit the lateral movement of the metal pieces during the compression thereof, abutments are provided adjacent the shoulders which are disposed perpendicular to faces of the metal pieces. Furthermore, an abutment is provided on the bottom edge of each of the metal pieces, which are disposed perpendicular to the face of the metal pieces to guide the metal pieces laterally with respect to each other.

In order to prevent displacement of the two metal pieces towards each other when they are mounted in the anchor, additional abutments are provided on the upper edge of each of the pieces, disposed perpendicular to the faces thereof. These additional abutments prevent parallel displacement of the two metal pieces in the anchor. The distance between the shoulders and these additional abutments is chosen such that both metal pieces securely lock into the anchor bar, but cannot be displaced parallel with respect to each other when tension is applied to the belt. When the metal pieces are compressed to release them from the anchor, these additional abutments cause the pieces to pivot to an oblique position, and move at an oblique angle with respect to each other so that one of the shoulders is released from the anchor and the entire clasp of the belt can be tilted out of the anchor bar.

It is therefore an object of the present invention to provide a belt clasp which is, mounted on the end of a belt loop for securing the belt to an anchor bar.

It is another object of the present invention to provide a clasp which is mounted on the end of a belt loop which is simple in design, inexpensive in cost, and reliable in operation.

Other objects and features of the present invention will become apparent from the following detailed description considered in connection with the accompanying drawing which discloses the embodiments of the invention. It is to be understood, however, that the drawing is designed for the purpose of illustration only and not as a definition of the limits of the invention.

In the drawing, wherein similar reference characters denote similar elements throughout the several views:

FIG. 1 is a plan view of a belt clasp constructed in accordance with the present invention, shown mounted on the end of a belt and disposed in an anchor, FIG. 1a is a plan view of the belt clasp, shown during one stage of insertion into or removal from the anchor;

FIG. 2 is a cross-sectional view of the belt clasp taken along section A-B of FIG. 1, and;

FIG. 3 is a side end view of the belt clasp.

Referring to the drawings, there is shown a pair of flat metal pieces 2 and 2' which are disposed in a laterally inverted position in an end loop of a belt 1 shown by the dotted lines in FIGS. 1 and 1a. The metal pieces comprise stamped flat sheet metal material or cast iron, having center openings 3 and 4 which include recesses 5 and 6. Both metal pieces 2 and 2' are displaceable longitudinally and are pulled towards and against each other by a pull spring 7 whose ends are secured in holes 8 and 9. The tension of pull spring 7 causes that both metal pieces to engage belt 1 with the ends of recesses 3 and 4.

Two shoulders 10 and 11 are provided on oppositely disposed sides of the pieces which engage the support surfaces 12 and 13 of the anchor bar when the clasp is disposed therein. The sides from which shoulders 10 and 11 project include abutments 14 and 15, which are disposed perpendicular to the planar faces of the metal pieces. As shown in FIG. 2, these two abutments are disposed in opposite directions. The abutments permit the laterial displacement of the two metal pieces when they are pressed by the thumb and/or index finger of a user.

Two additional abutments 16 and 17 are provided on the lower edges of the metal pieces and are disposed perpendicular to the faces thereof. These abutments also are disposed in opposite directions with respect to each other, and guide the metal pieces into their locked position in the anchor. Abutments 18 and 19 are provided on the upper edges of the metal pieces. Abutments 20 and 21 engage abutments 18 and 19 and thereby limit the lateral displacement of the metal pieces when they are not disposed in the anchor. The abutments on the metal pieces securely lock the clasp in the anchor, so that even when a force is exerted by the belt at an angle to the clasp, the clasp cannot be released from the anchor because of a rearward parallel displacement of the two metal pieces caused by the abutments and the forces exerted on the metal pieces.

To release the clasp from the anchor, pressure is exerted on abutments 14 and 15, respectively, by means of the thumb or the index finger inwardly parallel to the longitudinal axes of the metal pieces. Shoulders 20 and 21 thus disengage abutments 18 and 19 and metal piece 2' moves into the oblique position shown by the dotted lines in FIG. 1a. Shoulder 11' is then disengaged from surface 13 of the anchor bar, and then the other shoulder disengaged from the anchor, so that the clasp may be removed. The opposite procedure is followed to insert the clasp in the anchor. When the clasp is compressed during its insertion or removal, the ends of the metal pieces may engage the anchor bar when pushed in the direction of arrows 22 and 23, as shown in FIG. 1a. This allows easy pivotable movement of the pieces. After the metal pieces are inserted. After the fittings are introduced into the anchor bar, the force of spring 7 pulls the metal pieces 2 and 2' away from each other and shoulders 10 and 11 engage surfaces 12 and 13. Tension may then be applied to the belt. Both metal pieces have oblique sides 25 and 26, so that sufficient space is provided during the displacement of the metal pieces when the clasp is inserted into or released from the anchor.

While only a few embodiments of the present invention have been shown and described, it will be obvious that many changes and modifications may be made thereunto without departing from the spirit and scope of the invention.

What is claimed is:

1. A clasp for a belt, comprising:

at least two superimposed planar members, each having at least one opening for receiving a belt loop, and at least one outwardly projection shoulder integrally formed therewith for engaging an anchor and securing the belt therein;

a spring, coupled at each end to one of said planar members, for biasing said planar members towards each other;

first abutment members, affixed to a selected lateral edge of each of said planar members, disposed perpendicular thereto and extending outwardly in opposite directions from each of said planar members, for limiting the lateral displacement of said planar members with respect to each other;

second abutment members, each affixed to one of the bottom edges of said planar members, disposed perpendicular thereto and extending below the lower edges of said planar members in opposite directions so as to guide the lateral displacement of said planar members and prevent pivotal movement of said planar members with respect to each other when said planar members are disposed in an anchor; and third abutment members, each affixed to one of the top edges of said planar members, disposed at the end of said planar members opposite the end to which said shoulders are affixed, perpendicular to said planar members, and extending outwardly in opposite directions adjacent the top edge thereof so as to engage said shoulders on said planar members and thereby limit the lateral displacement of said planar members with respect to each other and prevent pivotal movement of said planar members when said planar members are disposed in an anchor.

2. The clasp as recited in claim 1, wherein said planar members further comprise fourth abutment members, integrally formed with said planar members, co-planar therewith and with said shoulders, and disposed adjacent said shoulders, for engaging said third abutment members provided on said planar members when said planar members are laterally displaced.

* * * * *